US012647814B2

(12) United States Patent　　(10) Patent No.:　US 12,647,814 B2
Wakim　　(45) Date of Patent:　Jun. 2, 2026

(54) UPGRADE RECOMMENDATIONS FOR WIRELESS WIDE AREA NETWORKS

(71) Applicant: Verizon Patent and Licensing Inc., Basking Ridge, NJ (US)

(72) Inventor: John N. Wakim, Salem, NH (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 535 days.

(21) Appl. No.: 18/192,095

(22) Filed: Mar. 29, 2023

(65) Prior Publication Data

US 2023/0239725 A1　　Jul. 27, 2023

Related U.S. Application Data

(63) Continuation-in-part of application No. 16/908,890, filed on Jun. 23, 2020, now Pat. No. 11,622,287.

(51) Int. Cl.
H04W 28/02　　(2009.01)
H04B 17/318　　(2015.01)

(52) U.S. Cl.
CPC ...... H04W 28/0242 (2013.01); H04B 17/328 (2023.05); H04W 28/0284 (2013.01)

(58) Field of Classification Search
CPC ....... H04B 17/328; H04L 47/122–127; H04M 3/362–367; H04W 16/00–32; H04W 24/06–08; H04W 28/00–26
See application file for complete search history.

(56) References Cited

U.S. PATENT DOCUMENTS

| | | | |
|---|---|---|---|
| 6,526,279 B1 | 2/2003 | Dent | |
| 6,628,952 B1 | 9/2003 | Hankins et al. | |
| 2004/0214583 A1 | 10/2004 | Graham et al. | |
| 2006/0223546 A1 | 10/2006 | Claussen | |
| 2009/0191915 A1 | 7/2009 | Abramson et al. | |
| 2010/0232529 A1 | 9/2010 | Fettweis et al. | |
| 2010/0271994 A1 | 10/2010 | Wolfe | |
| 2014/0105134 A1 | 4/2014 | Buddhikot et al. | |
| 2015/0011178 A1* | 1/2015 | Jovanovic | H04W 16/18 455/446 |
| 2015/0031327 A1 | 1/2015 | Townley et al. | |

(Continued)

FOREIGN PATENT DOCUMENTS

| | | |
|---|---|---|
| EP | 3068176 | 9/2016 |
| WO | 2010/017219 | 2/2010 |

OTHER PUBLICATIONS

Oxford Learner's Dictionary meaning of "histogram", printed on Jun. 3, 2025. Retrieved from Internet: <https://www.oxfordlearnersdictionaries.com/us/definition/english/histogram?q=histogram>. (Year: 2025).*

*Primary Examiner* — Ronald Eisner

(57)　　　　ABSTRACT

A device comprises a processor. The processor may be configured to: receive information about an existing cell site; and generate a distance histogram for the existing cell site based on the received information. Additionally, the processor may be configured to at least one of: calculate, using the generated distance histogram, a first value that indicates an amount of traffic to be offloaded from the existing cell site to a new cell site, or calculate, using the generated distance histogram, a second value that indicates an amount of traffic to be offloaded from operating bands of the existing cell site as a result of an upgrade at the existing cell site.

20 Claims, 14 Drawing Sheets

(56)           References Cited

U.S. PATENT DOCUMENTS

2015/0215128  A1      7/2015  Pal
2015/0334576  A1 *  11/2015  Sofman ................. H04W 16/18
                                                         455/456.1
2017/0150365  A1 *   5/2017  Goswami ............. H04W 16/18

* cited by examiner

500

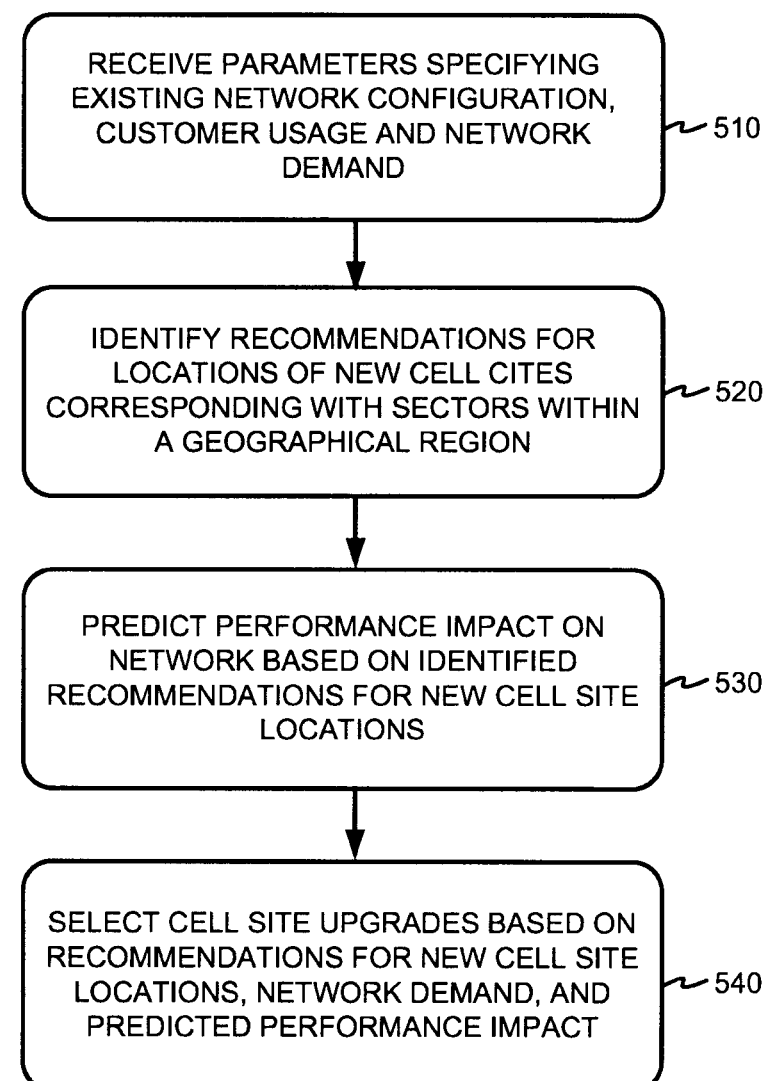

RECEIVE PARAMETERS SPECIFYING EXISTING NETWORK CONFIGURATION, CUSTOMER USAGE AND NETWORK DEMAND ~510

IDENTIFY RECOMMENDATIONS FOR LOCATIONS OF NEW CELL CITES CORRESPONDING WITH SECTORS WITHIN A GEOGRAPHICAL REGION ~520

PREDICT PERFORMANCE IMPACT ON NETWORK BASED ON IDENTIFIED RECOMMENDATIONS FOR NEW CELL SITE LOCATIONS ~530

SELECT CELL SITE UPGRADES BASED ON RECOMMENDATIONS FOR NEW CELL SITE LOCATIONS, NETWORK DEMAND, AND PREDICTED PERFORMANCE IMPACT ~540

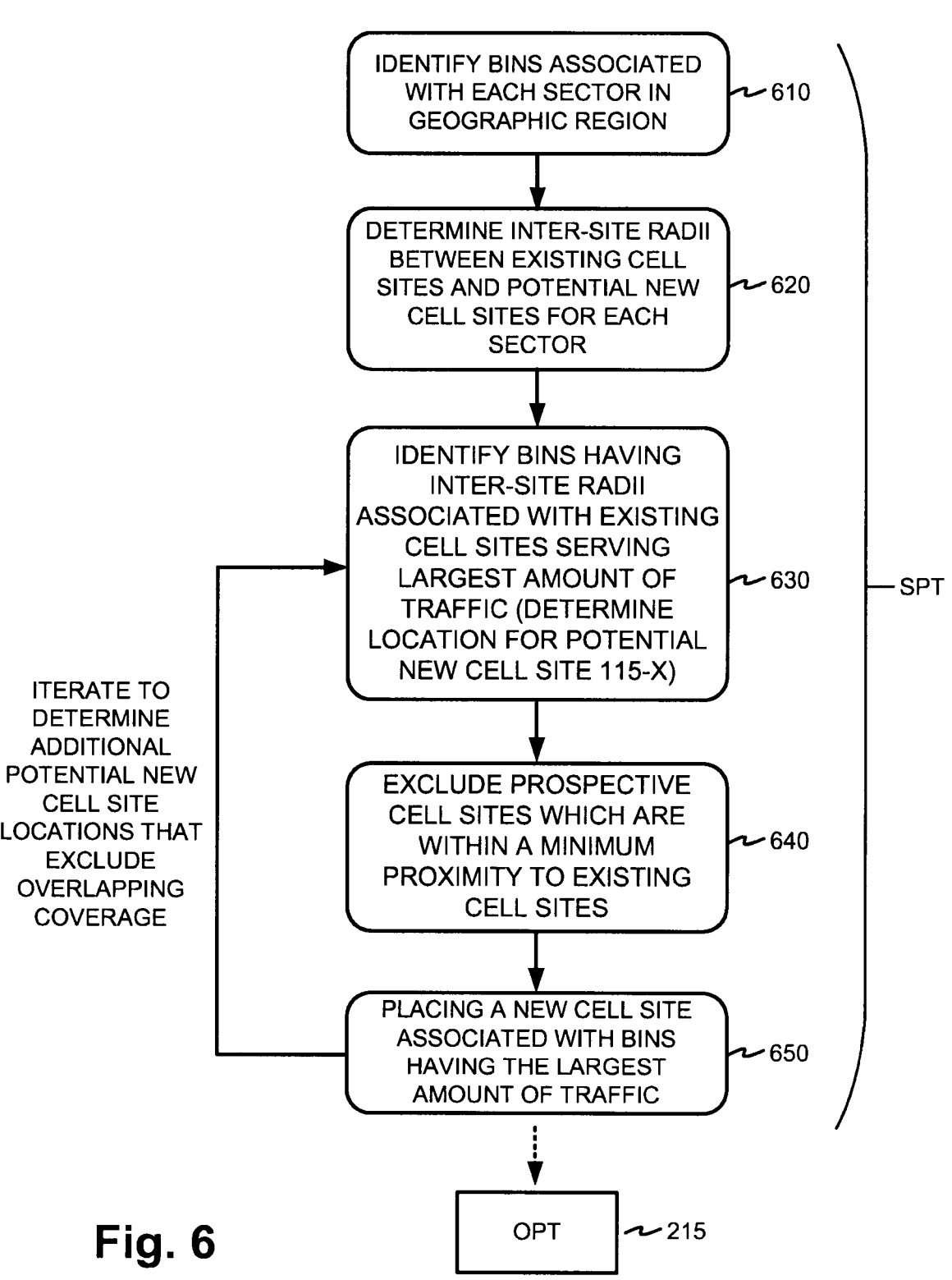

IDENTIFY BINS ASSOCIATED WITH EACH SECTOR IN GEOGRAPHIC REGION — 610

DETERMINE INTER-SITE RADII BETWEEN EXISTING CELL SITES AND POTENTIAL NEW CELL SITES FOR EACH SECTOR — 620

IDENTIFY BINS HAVING INTER-SITE RADII ASSOCIATED WITH EXISTING CELL SITES SERVING LARGEST AMOUNT OF TRAFFIC (DETERMINE LOCATION FOR POTENTIAL NEW CELL SITE 115-X) — 630

EXCLUDE PROSPECTIVE CELL SITES WHICH ARE WITHIN A MINIMUM PROXIMITY TO EXISTING CELL SITES — 640

PLACING A NEW CELL SITE ASSOCIATED WITH BINS HAVING THE LARGEST AMOUNT OF TRAFFIC — 650

ITERATE TO DETERMINE ADDITIONAL POTENTIAL NEW CELL SITE LOCATIONS THAT EXCLUDE OVERLAPPING COVERAGE

— SPT

OPT — 215

Fig. 6

Solid Circle: too close for small cell/micro cell
Dashed Circle: too close for macro cell

700

800 →

DETERMINE REGIONS OF RF DOMINANCE FOR EXISTING SITES — 802

CALCULATE POTENTIAL OFFLOADS FOR EXISTING SITES — 804

OBTAIN SOLUTION LOCATIONS — 806

CALCULATE COVERAGES OF SOLUTIONS — 808

FOR EACH SOLUTION, FOR EACH GEOBIN, DETERMINE OFFLOAD FLAG — 810

CALCULATE PREDICTED OFFLOAD — 812

| S BAND | E BAND | LB THRESHOLD |
|--------|--------|--------------|
| LOW | LOW | +6 dB |
| LOW | HIGH | -6 dB |
| HIGH | LOW | +6 dB |
| HIGH | HIGH | 0 dB |

1100 →

1102 — RETRIEVE LIST OF EXISTING SITES AND DATA ON DEPLOYED TECHNOLOGIES

1104 — OBTAIN DISTANCE HISTOGRAMS

1106 — OBTAIN DEVICE PENETRATION DATA

1108 — GENERATE DISTANCE CUTOFFS FOR EACH POSSIBLE OFFLOAD

1110 — DETERMINE BANDWIDTH RATIOS

1112 — CALCULATE OFFLOAD

UPGRADE RECOMMENDATIONS FOR WIRELESS WIDE AREA NETWORKS

CROSS-REFERENCE TO RELATED APPLICATION

This application is a continuation-in-part of U.S. patent application Ser. No. 16/908,890, filed on Jun. 23, 2020, and titled "Upgrade Recommendations for Wireless Wide Area Networks," the disclosure of which is incorporated by reference herein in its entirety.

BACKGROUND

Increased demand for wireless networking services drives the deployment of wireless wide area network (WWAN) upgrades. The WWAN upgrades are designed to improve performance, availability, and/or reliability of wireless communication among various network infrastructure devices and/or mobile devices. Since the infrastructure of the WWAN can be complex and extend over large geographical regions, conventional approaches for deploying new sites and upgrading existing equipment can be resource intensive and time consuming.

BRIEF DESCRIPTION OF THE DRAWINGS

FIG. 5 is a flowchart of an exemplary process for providing upgrade recommendations for a wide area wireless network;

FIG. 6 is a flowchart of an exemplary process for a solution placement tool (SPT) for recommending locations and types of potential new cell site placements;

FIG. 10A shows a table of example load balancing thresholds for different new cell site operating bands and existing cell site operating bands;

DETAILED DESCRIPTION OF EXAMPLE EMBODIMENTS

The following detailed description refers to the accompanying drawings. The same reference numbers in different drawings may identify the same or similar elements. The following detailed description does not limit the invention.

Embodiments described herein are directed to upgrade recommendations for wireless wide area networks (WWAN). In an embodiment, an automated system and/or method may create an optimized list of geo-located cell site upgrades and capacity driven cell site placements. In formulating recommendation upgrades, embodiments may consider, for example, variables such as current cell site configurations, radio frequency (RF) conditions, topography, location of existing cell sites, geolocated projected usage and/or current usage, out of millions of potential new cell site location placements optimized across a large geographical region (e.g., across the United States).

Various embodiments may automate and optimize site placement recommendations through capacity offload prediction and may subsequently translate the prediction into upgrade recommendations. Such recommendations may include, for example, performance, reliability, and/or network upgrades. These recommendations, for example, may include carrier additions, antenna upgrades, and/or new cell site build placements. New cell site builds may be based on Fifth Generation (5G) standards (including New Radio (NR) air interface standards), Long Term Evolution (LTE) wireless standards (e.g., LTE, LTE Advanced, etc.), and/or any other existing WWAN standards. Accordingly, new cell site builds may include macro cell sites, small cell sites, and/or ultra-wide band (UWB) nodes. As used herein, "recommendations" may include various guides, rules, and/or detailed plans of action for optimizing WWAN capability. As used herein, the term "optimize" or "optimization" of the WWAN upgrades may be generalized to include WWAN upgrades that make improvements to the performance and functionality of the WWAN, in addition to upgrades that may make the best and/or most effective improvements to the performance and/or functionality the WWAN based upon available resources.

Figure 1:
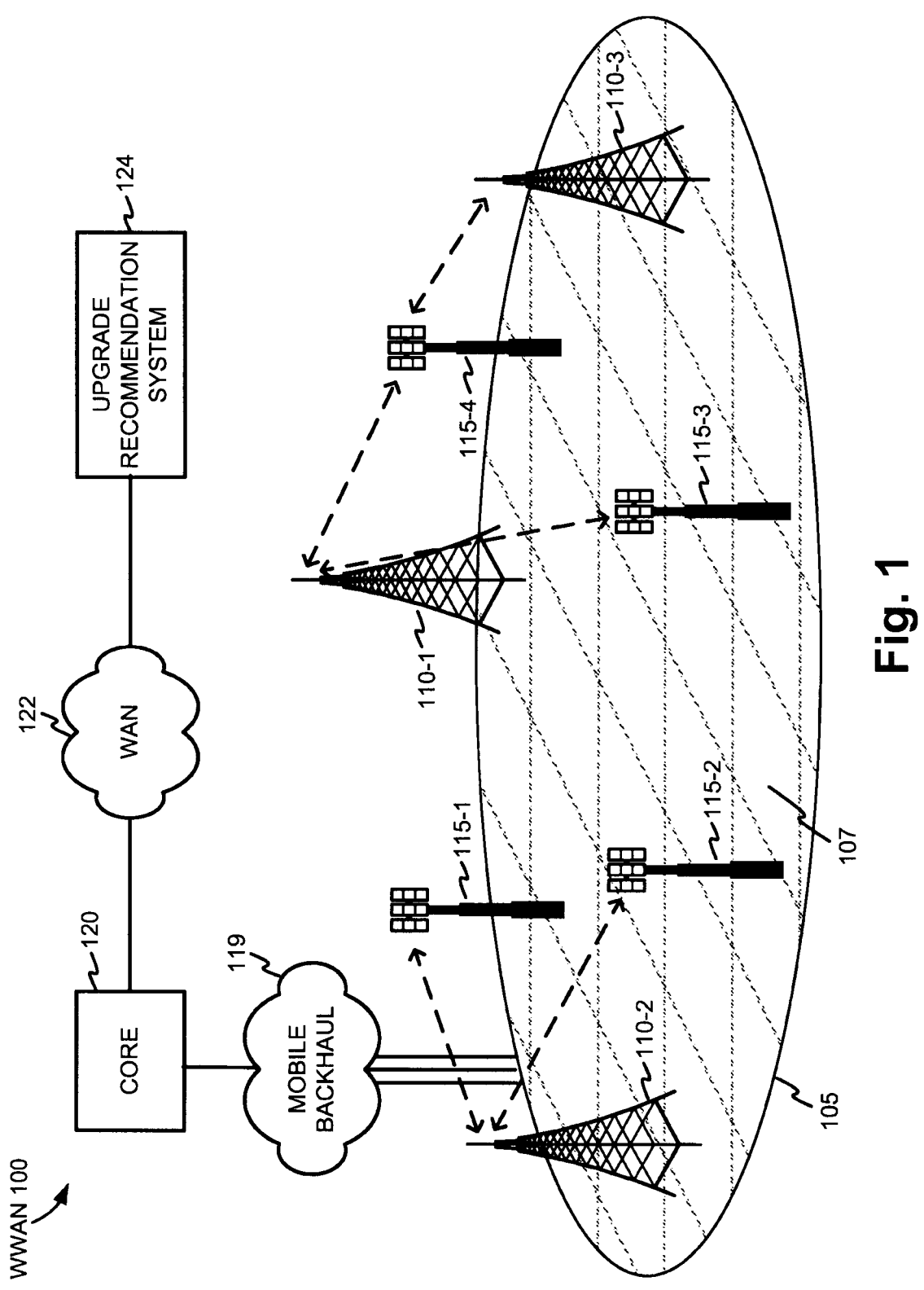
FIG. 1 is a diagram showing an exemplary WWAN environment associated with an upgrade recommendation system according to an embodiment.

FIG. 1 is a diagram showing an exemplary WWAN 100 environment associated with an upgrade recommendation system (URS) according to an embodiment. WWAN environment 100 may include a geographical region 105, a positioning reference system made up of a plurality of bins 107, cell sites 110 (herein referred to plurally as "cell sites 110," generically as "cell site 110," and individually as "cell site 110-*x*"), potential new cell sites 115 (herein referred to plurally as "potential new cell sites 115," generically as "potential new cell site 115" and individually as "potential new cell site 115-*x*"), mobile backhaul 119, core 120, WAN 122, and URS 124.

Cell sites 110 may exchange traffic data with core 120 via mobile backhaul network 119. In some embodiments, mobile backhaul network 119 may further exchange data between cell sites 110 without having to go through core 120. Core 120 may further exchange data via WAN 122 to communicate with other various network devices. In the embodiment illustrated in FIG. 1, URS 124 may be included in WWAN 100 and exchange data with other network devices via WAN 122 and/or core 120. However, in other embodiments, URS 124 may not be interconnected to WWAN 100.

One or more sectors associated with cell sites 110 within geographical region 105 may be selected as candidate(s) for recommendations for various upgrades. As used herein, a sector may refer to a portion of a cell site 110-x which produces a wireless coverage area. In an embodiment, the selection of sectors of cell sites 110 recommended for upgrades may be automatically determined by URS 124 based on "capacity triggers." As used herein, a capacity trigger may be defined as one or more sectors and/or cell sites 110 which may benefit from additional communications capacity based on demand from users and/or other devices (e.g., internet of things (IoT) devices). The desirability of additional capacity for WWAN 100 may be determined, for example, through measurements indicating the amount of data exchanged within WWAN 100, the average headroom and/or capacity for additional data exchange within WWAN 100, error rates and/or congestion metrics exceeding predetermined thresholds over designated periods of time. Additionally or alternatively, the desirability for additional capacity may be based on quality metrics associated with WWAN 100, such as, for example, the number of dropped calls and/or packets, perceived voice quality, delay, and/or other quality metrics based on user feedback. As used herein, the term "additional capacity" for WWAN 100 within geographical region 105 may refer to, for example, upgrades providing the ability to: wirelessly exchange more data; increase speed of data throughput; reduce latency; increase bandwidth; increase wireless coverage within geographical area 105; service a greater number of users within geographical area 105; and/or provide additional services and/or protocols (e.g., multimedia broadcast multicast service).

In an embodiment, URS 124 may provide upgrade recommendations for WWAN 100 by initially determining locations of plurality of potential new cell sites 115 (e.g., 5G cell sites), and the type of cell site that would be most appropriate (e.g., small cell, macro cell, etc.). The locations of potential new cell sites 115, as well as the locations of existing cell sites 110, may be specified by identifying a particular bin 107 in which they are positioned. Bins 107 may be any shape and size. For example, each bin 107 may be square shaped and have a dimension of 0.1 mile x 0.1 mile, or some other specified size. Each bin 107 may be uniquely identified by an integer, string, or any other data type (e.g., k bin, where k=1 N), where the value N may be a large enough integer so that uniquely identifiable k bins 107 may extend over vast geographical regions (e.g., a city, state, and/or the entire United States).

Once the locations of potential new cell sites 115 are determined, the offload potential (i.e., the reduction in exchanged data of existing cell sites 100) of each potential new cell site 115 may be predicted to determine their efficacy for improving WWAN 100. For example, as shown in FIG. 1 the offload potential of potential cell sites 115-1 and 115-2 may be predicted for existing cell site 110-2. Similarly, the offload potential of potential new cell sites 115-3 and 115-4 may be predicted for existing cell sites 110-1 and 110-3. Using these performance predictions, along with a variety of other information (as will be discussed in reference to FIGS. 2 and 3, optimization techniques may be used to determine the most appropriate recommendation for upgrades to WWAN 100.

Further referring to FIG. 1, cell sites 110 and/or potential new cell sites 115 may operate with any type of radio access network and can be compatible with known wireless standards. Such wireless standards may include, for example, fifth generation (5G) (e.g., New Radio), fourth generation (4G) (e.g., LTE, LTE Advanced), GSM, UMTS, IS-2000, etc. In some embodiments, cell sites 110 may include a wireless access point which can service any type of Wi-Fi standard (e.g., any IEEE 801.11x network, where x=a, b, c, g, and/or n), and/or include any other type of wireless network technology for covering larger areas, and may include a mesh network (e.g., IEEE 801.11s) and/or or a WiMAX IEEE 802.16. Cell sites 110 and/or potential new cell sites 115 may be embodied as any type of known cell site, which may include, for example, macro cells, micro cells, femto cells, etc.

Mobile backhaul network 119 may be any type of network which supports one or more cell sites 110 and potential new cell sites 115 for interfacing with core 120. Mobile backhaul network 119 may include Cell Site Routers (CSRs), Extended Backhaul (EBH) network(s), optical networks which include wavelength division multiplexed (WDM) optical components, multiservice provisioning platforms (MSPPs), metro-Ethernet networks, etc.

Core 120 may be any type of wide area wireless core networking infrastructure that provides, for example, wireless connectivity, mobility management, session management, broadcast (e.g., evolved multimedia broadcast multicast service (eMBMS)) functionality, authentication, and/or packet transport to support wireless communication between mobile devices and cell sites 110 and/or potential new cell sites 115. Core 120 may be compatible with known wireless standards which may include, for example, 4G (e.g., LTE, LTE Advanced, etc.), 5G (e.g., New Radio), Global System for Mobile Communications (GSM), Universal Mobile Telecommunications System (UMTS), IS-2000, etc.

WAN 122 may include any type of wired or wireless network covering larger areas. For example, WAN 122 may include a metropolitan area network (MAN), a Public Switched Telephone Network (PSTN), an ad hoc network, an intranet, the Internet, a fiber optic-based network, a wireless network, and/or a combination of these or other types of networks. WAN 122 may be an internet protocol (IP) based network or utilize Multi-Protocol Label Switching (MPLS), and may include a mesh network (e.g., IEEE 801.11s) and/or a WiMAX IEEE 802.16. WAN 122 may include one or more circuit-switched networks and/or packet-switched networks.

URS 124 may be any type of network device which may receive data traffic, network utilization information, and/or network configuration information regarding WWAN 100, and generate and provide upgrade recommendations for WWAN 100. Accordingly, URS 124 may be implemented as a general processor-based system executing software (e.g., a server or other network device), embodied using dedicated hardware (e.g., application specific integrated circuits (ASICs), field programmable gate arrays (FPGAs), etc.), or as a combination thereof. URS 124 may interface to core 120 thorough WAN 122 (as shown in FIG. 1) or may alternatively connect to 120 through a local interface. URS 124 may interface to WAN 122 using an Ethernet connection over transmission control protocol/internet protocol (TCP/IP), where the physical interfaces may be any interface having sufficient resources to support the exchange of traffic alerts and traffic notifications. An interface may include, for example, 10BASE-T, 1000BASE-TX, and/or 1000BASE-T over twisted pair, coaxial cable, and/or optical fiber. Alternatively, URS 124 may connect with core 120 over a local area network using Ethernet and TCP/IP based networking standards.

Figure 2:
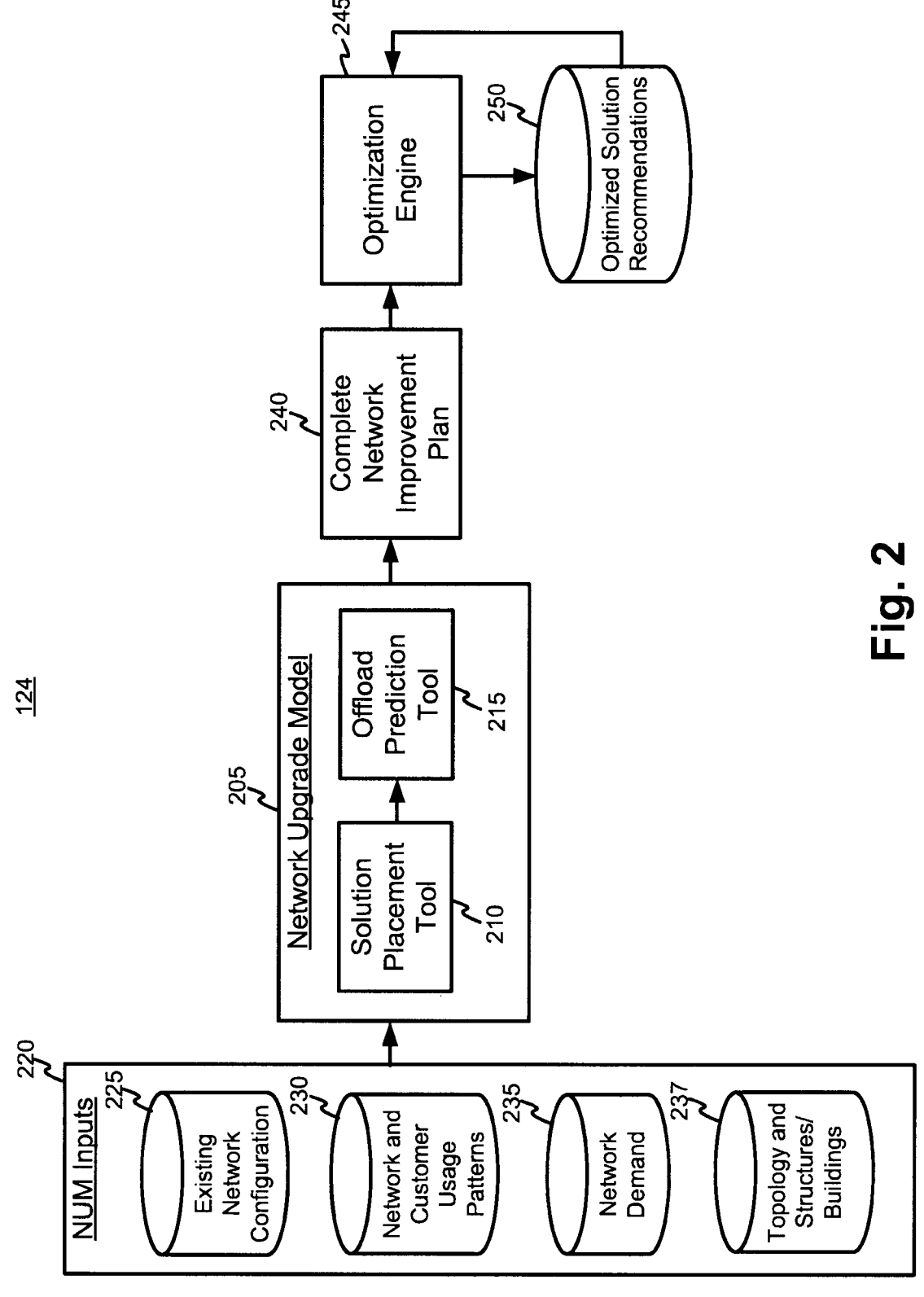
FIG. 2 is a block diagram showing an exemplary upgrade recommendation system according to an embodiment.

FIG. 2 is a block diagram illustrating an exemplary upgrade recommendation system (URS) 124 according to an embodiment. URS 124 may include network upgrade model (NUM) 205, which further includes solution placement tool (SPT) 210, and offload prediction tool (OPT) 215. URS 124 further includes NUM inputs 220, including existing network configuration data 225, network and customer usage patterns 230, network demand 235 and topology and structures/buildings 237. URS 124 further includes complete network improvement plan 240, optimization engine 245, and Optimized Solution Recommendations 250.

In an embodiment, NUM 205 may automatically determine potential new cell site placement recommendations within geographical region 105, and then determine the offload potential of each potential new cell site placement within the existing WWAN 100. Specifically, SPT 210 may automatically determine possible locations of potential new cell sites 115 in geographical region 105, where the locations may be specified by specific bins 107 (e.g., k bin, k=1, . . . , N). Additionally, SPT 210 may further determine predicted network settings (e.g., expected transmission radius), and/or cell site types (e.g., macro cell, micro cell, etc.) for each of the potential new cell sites 115. SPT 210 may provide all possible locations for recommended solutions (e.g., in high usage areas) based, for example, on k bins to OPT 215. Additionally, SPT 210 may provide predicted network settings and/or cell site types to OPT 215 to predict their effects in WWAN 100 as described below.

OPT 215 may estimate the data throughput of the potential new cell sites by modelling the effectiveness of all of the potential new cell sites 115 in offloading data traffic from existing cell sites 110. OPT 215 may produce a ranked list for possible locations of potential new cell sites 115, where the ranking is based upon the improvement each potential new cell site 115 may provide with respect to traffic handled by existing cell sites 110. OPT 215 may also predict the associated customer impact of any recommended network improvement. The modelling used by OPT 215 may take into account actual data flows over time which are experienced by existing cell sites 110, which may be measured using conventional techniques, such as, for example, packet trace traps placed within WWAN 100. Actual data flows may also be measured from one or more mobile devices at various positions within geographic region 105. In an embodiment, mobile devices may further provide position data (e.g., global position data (GPS), and/or data which may be used to determine/refine position (e.g., time delay, signal strength, etc.) to OPT 215. OPT 215 may use mathematical models of WWAN 100 to predict the effectiveness of solutions determined by SPT 210. By using SPT 210 and OPT 215 together, the effectiveness of potential new cell sites 115 may be ranked subsequent for use in downstream modules such as, for example, Complete Network Improvement Plan (CNIP) 240 and Optimization Engine 245, for determining optimal network upgrade recommendations.

In some embodiments, OPT 215 may receive a list of new cell sites 115 (also referred to as solutions 115), the possible new cell site locations (output by SPT 210 ), and other cell site information (e.g., the locations of existing cell sites 110, transmission patterns of each site 110, settings for new cell sites 115, etc.) from NUM inputs 220. Based on the received inputs, OPT 215 may make at least two sets of predictions: a set of predictions on offloading traffic from existing cell sites 110 to new cell sites 115; and a set of predictions on offloading traffic from existing cell sites 110 due to modifications to existing technology (e.g., adding additional traffic capacity, modifications and/or upgrades to existing cell sites 110, and mobile devices that connect to cell sites 110). An exemplary process performed by OPT 215 to render offload predictions, from existing cell sites 110 to each solution 115, is described below with reference to FIG.

8; and an exemplary process performed by OPT 215 to render predictions for offloading due to changes in existing technology or equipment is described below with reference to FIG. 11.

NUM inputs 220, which may be received by NUM 220 for use by SPT 210 and OPT 215, include information regarding the existing network topology and surrounding environment which may affect radio transmission, and customer usage information/demand to assist in recommending potential new cell sites 115 and/or upgrades to existing cell sites 110. For example, NUM inputs 220 may include existing network configuration (ENC) 225, network and customer usage patterns (NCUP) 230, network demand (ND) 235, and topology and structures/buildings (TSB) 237. ENC 225 takes into account the location of existing cell sites 110, the wireless coverage of existing cell sites 110, the surrounding geography such as topology, water bodies, etc., the configuration and/or orientation of the antennas for existing cell sites 110, power levels and/or ranges of existing cell sites 110, etc. NCUP 230 may include histories of data flows with WWAN 110 as a function of time, and identification of patterns of data flows through existing cell sites 110. In an embodiment, NCUP 230 may further use timeslot and radio resource control (RRC) data to infer usage patterns. Additionally or alternatively, measurements of data flows may be determined using data exchanged with mobile device(s) distributed within one or more bins 107, wherein the identity of a particular bin (e.g., k bin) may provide location information of the mobile device. ND 235 may characterize existing and future customer demand for network services, including the amounts of data, the types of data, the priorities of data flows, etc. TSB 237 may include information relating to the natural topology of geographic region 105 (e.g., topological mappings, locations of water bodies, marshes, hills, soil types, etc.); and information relating to man-made structures and buildings (e.g., location, size, materials of construction, etc.).

Further referring to FIG. 2, NUM 205 provides output to Complete Network Improvement Plan (CNIP) 240, which may include a large number of ranked network improvement solutions geographical area 105 (e.g., over 5 million potential new cell site locations). Accordingly, CNIP 240 provides a nearly comprehensive set of recommendations for improving WWAN 100 for use by optimization engine (OE) 245. OE 245 may anticipate WWAN capacity based on upgrades to existing cell sites 110 and/or locations of potential new cell sites 115 and upgrades to existing cell sites by modeling a list of targeted cell site sectors and solutions for capacity planning. OE 245 may process through a large number of scenarios to automatically determine optimal recommendation upgrades based on the information from the CNIP 240, where the optimal recommendation upgrades maximize customer impact given various constraints (e.g., operational constraints, resource constraints, etc.). The optimal recommendation upgrades may be stored in the optimized solution recommendations (OSR) database 250, of which may be numerically reduced by a significant number from the number of solutions originally presented by CNIP 240 (e.g., 30,000 recommendations for potential new cell site locations). Additionally, to ensure no duplicate solutions exist, or that solutions overlap in wireless coverage, OE 245 may further iterate on the solutions in OSR database 250. Details of OE 245 are described in more detail below in reference to FIG. 3. The embodiment for URS 124 shown in FIG. 2 is merely exemplary and, other implementations may include fewer components, different components, differently arranged components, or additional components than exemplified in FIG. 2. Additionally or alternatively, one or more components of URS 124 may perform functions described as being performed by one or more other components.

Figure 3:
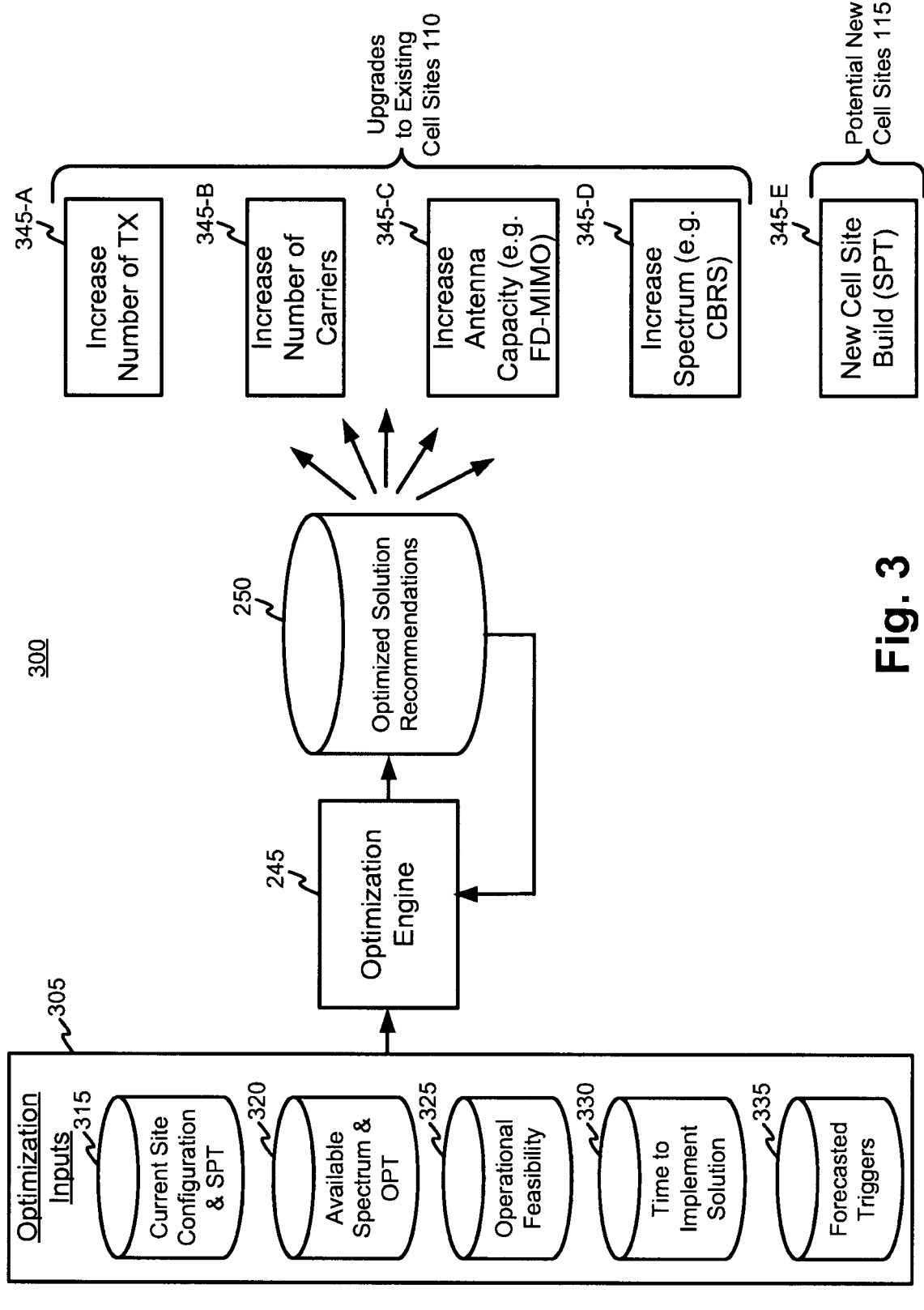
FIG. 3 is a block diagram illustrating an exemplary process associated with an optimization engine according to an embodiment.

FIG. 3 is a block diagram illustrating details of an exemplary optimization flow 300 according to an embodiment. Optimization flow 300 may include OE 245, which receives optimization inputs 305 to produce optimized solution recommendations (OSR) 250. OSR 250 may be determined for sectors having actual and/or projected constraints. That is, the solutions determined by optimization engine 245 may be associated with sectors in existing cell sites 110 which may already be experiencing congestion in data traffic flows and would immediately benefit from increased data capacity. In other embodiments, optimization engine 245 may provide OSR 250 for sectors that are predicted to have congestion in data traffic in the future, based on foreseeable growth in WWAN 100 usage (e.g., forecasted capacity triggers 335).

OSR 250 may rely upon one or a combination of approaches for implementing improvements to WWAN 100, which may include, for example, upgrades to existing cell sites 110 that: increase the number of transmitters (TX) 345-A; increase the number of carriers 345-B; increase antenna capacity (e.g., frequency division multiple input multiple output (FD-MIMO) 345-C; and/or increase spectrum 345-D (e.g., add Citizens Broadband Radio Service (CBRS), provide carrier aggregation, utilize additional unlicensed spectrum, etc.). Optimized solution recommendations 250 may further include recommending new cell sites builds 345-E based on recommendations from SPT 210 and OPT 215. The solution recommendations may consider any combination of approaches 345-A through 345-E, and may further include future technologies (e.g., approaches associated with the 5G wireless communication standard).

In more detail, optimization flow 300 may be used for anticipating WWAN capacity in view of various potential upgrades by modeling a list of targeted cell site sectors and solutions for capacity planning. As inputs, optimization engine 245 may include current cell site 110 location/configuration and potential new cell site 115 location/configuration (via SPT 210) 315, available spectrum and OPT data 320, operational feasibility data 325, time to implement solution 330, and forecasted capacity triggers 335. From these inputs, OE 245 may use a multivariate optimization math model for arriving optimal solution recommendations 250, which may include, for example, a mixed integer linear programming problem (MILP) formulation. Decision variables designated by MILP may include whether to upgrade a specific cell site 110 (or portion thereof) or not. An objective function may be used by MILP which may, for example, maximize the highest customer impact or other objectives relating to upgrading the network (e.g., maximizing capacity added, and/or cell sites upgraded, etc.). Various constraints may be used in the optimization process. For example, constraints may include market area related constraints (where market can be any possible geographic boundary such as, for example, a cellular market area) to prevent overbuilding a site and/or underbuilding in cities or other market areas; operational feasibility constraints (e.g., limitations on quantity of builds per year); and/or decisions whether to upgrade cell sites 110 that are proximate to an existing cell site 110-*x* which is to be upgraded. In some implementations, OE 245 may use a solution rejection feedback loop to improve the optimization process by training the algorithm to avoid specific rejected solutions in an automated manner. Thus, the rejection feedback loop may avoid inefficiencies and/or redundant solutions.

Accordingly, OE 245 determines practical recommendations based on business criteria (such as consumer demand), type of potential new cell site 115 (e.g., macro sector on tall tower versus small cell on telephone pole, structure type). In more detail, referring to FIG. 3, current site configuration and SPT data 315 may include information regarding existing cell sites 110 and potential new cell sites 115 (e.g., locations specified by k bin value, cell types (e.g., macro-cell, micro-cell), transmission radius, etc.). Available spectrum and OPT data 320 may include the spectrum currently available for use within the geographical region 105, what spectrum may be available for licensing, etc. Operational feasibility 325 may include information associated with operating cell sites at geographical region 105, radio frequency (RF) interference issues, spectrum licensing, etc. Time to implement solution 330 may include implementation effort (e.g., time and/or manpower requirements based on cell site type, geography, etc.), and/or a measure of the level of effort required for upgrading existing cell sites 110 and/or installing potential new cell sites 115. Forecasted capacity triggers 335 include information providing indicators of one or more sectors in geographical region 105 which may benefit from upgrades implementing additional capacity. Determining forecasted capacity triggers 335 may be based on, for example: measurements indicating the amount of data exchanged within WWAN 100, wherein the measurements can be associated with specific times (e.g., rush hour); the average headroom and/or capacity for additional data exchange within WWAN 100; error rates; and/or congestion metrics. Additionally or alternatively, forecasted capacity triggers 335 may be based on quality metrics associated with WWAN 100, such as, for example, the number of dropped calls and/or packets, perceived voice quality, delay, and/or other quality metrics based on user feedback. By using forecasted capacity triggers 335, a provider may determine which geographical regions 105, and/or sectors therein, may receive the greatest benefit from upgrades to WWAN 100, thus maximizing the benefit for the effort expended in implementing upgrades to WWAN 100.

The embodiment for optimization flow shown in FIG. 3 is merely one implementation. Other implementations may include fewer components, different components, differently arranged components, or additional components than illustrated in FIG. 3. Additionally or alternatively, one or more components of optimization flow 300 may perform functions described as being performed by one or more other components.

Figure 4:
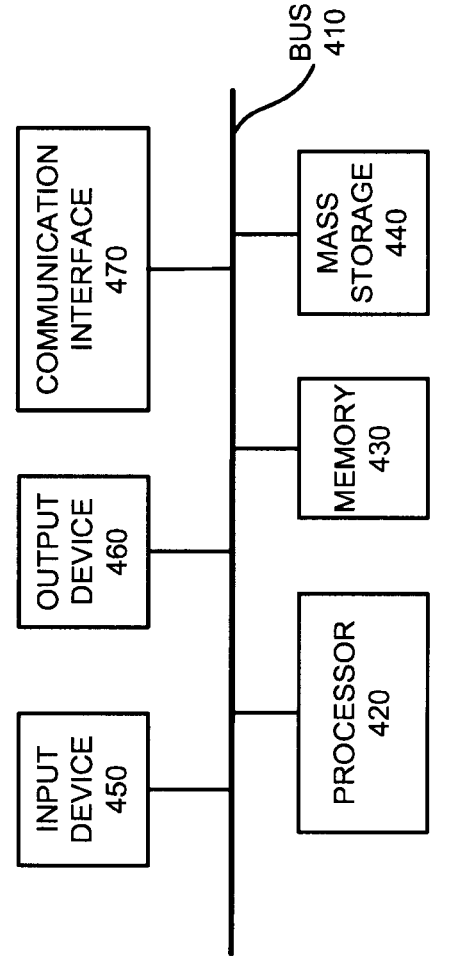
FIG. 4 is a block diagram illustrating components of an exemplary network device according to an embodiment.

FIG. 4 is a block diagram showing exemplary components of a network device 400. Network device 400 may be implemented in one or more components that reside in WWAN 100 and be a stand-alone device such as URS 124, SPT 210, OPT 215, OE 245, etc., or may be instantiated in software in another network device that may, for example, be included in core 120. Alternatively, network device 400 may reside outside WWAN 100 and be functionally coupled to WAN 122 and/or core 120. Network device 400 may include a bus 410, a processor 420, a memory 430, mass storage 440, an input device 450, an output device 460, and a communication interface 470.

Bus 410 includes a path that permits communication among the components of network device 400. Processor 420 may include any type of single-core processor, multi-core processor, microprocessor, latch-based processor, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic. For example, processor 420 may be an x 86 based CPU, and may use any operating system, which may include varieties of Windows, UNIX, and/or Linux. Processor 420 may also use high-level analysis software packages and/or custom software written in any programming and/or scripting languages for interacting with other network entities.

Memory 430 may include any type of dynamic storage device that may store information and/or instructions for execution by processor 420, and/or any type of non-volatile storage device that may store information for use by processor 420. For example, memory 430 may include a random access memory (RAM) or another type of dynamic storage device, a read-only memory (ROM) device or another type of static storage device, and/or a removable form of memory, such as a flash memory. Mass storage device 440 may include any type of on-board device suitable for storing large amounts of data, and may include one or more hard drives, solid state drives, and/or various types of Redundant Array of Independent Disk (RAID) arrays.

Input device 450, which may be optional, can allow an operator to input information into network device 400, if required. Input device 450 may include, for example, a keyboard, a mouse, a pen, a microphone, a remote control, an audio capture device, an image and/or video capture device, a touch-screen display, and/or another type of input device. In some embodiments, network device 400 may be managed remotely and may not include input device 450. Output device 460 may output information to an operator of network device 400. Output device 460 may include a display (such as a Liquid Crystal Display (LCD)), a printer, a speaker, and/or another type of output device. In some embodiments, network device 400 may be managed remotely and may not include output device 460.

Communication interface 470 may include a logical component that includes input and/or output ports, input and/or output systems, and/or other input and output components that facilitate the transmission of data to other devices. For example, communication interface 470 may include a network interface card (e.g., Ethernet card) for wired communications and/or a wireless network interface (e.g., a Wi-Fi) card for wireless communications. Communication interface 470 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form. Communication interface 470 may further include one or more wired and/or wireless Radio Frequency (RF) transceivers that enable communications with WWAN 100 and/or other network devices (e.g., core 120) in WWAN 100. An RF transceiver may include an RF transmitter that receives signals to be transmitted wireles sly and performs signal processing on the signals before providing the signals to an antenna assembly (not shown), and an RF receiver (not shown) that receives signals from the antenna assembly and performs signal processing on the received signals before providing the received signals to processor 420. For example, the RF transceiver may perform analog-to-digital and digital-to-analog conversion, modulation and demodulation, up-conversion and down-conversion, and/or amplification of signals.

As described below, network device 400 may perform certain operations relating to generating recommendation upgrades for WWAN 100. Network device 400 may perform these operations in response to processor 420 executing software instructions contained in a computer-readable medium, such as memory 430 and/or mass storage 440. The software instructions may be read into memory 430 from another computer-readable medium or from another device. The software instructions contained in memory 430 may cause processor 420 to perform processes described herein, such as, for example, processes 500 depicted in FIG. 5 and/or process 600 depicted in FIG. 6. Alternatively, hard-wired circuitry may be used in place of, or in combination with, software instructions to implement processes described herein. Thus, implementations described herein are not limited to any specific combination of hardware circuitry and software.

Although FIG. 4 shows exemplary components of network device 400, in other implementations, network device 400 may include fewer components, different components, additional components, or differently arranged components than depicted in FIG. 4.

FIG. 5 is a flowchart showing an exemplary process 500 for generating upgrade recommendations for WWAN 100 according to an embodiment. Process 500 may be performed by network device 400, which may be external to core 120 (e.g., implemented in URS 124) and execute instructions by processor 420 for generating upgrade recommendations for WWAN 100. Alternatively, in another embodiment, network device 400 may be embodied as a network element residing in core 120 and perform additional standard network core functions in addition to generating upgrade recommendations for WWAN 100. Processor 420 may receive parameters, e.g., network upgrade model inputs 220, which specify an existing network configuration 225, network and customer usage patterns 230, and/or network demand 235 (Block 510). In an embodiment, the existing network configuration may include existing wireless coverage, existing cell site locations, time slot data, and/or radio resource control (RRC) data.

Processor 420 may identify recommendations for locations of potential new cell sites 115 corresponding to sectors within a geographical region 105 associated with a network (e.g., WWAN 100) (Block 520). Identifying recommendations may be based on the existing network configuration 225, customer usage patterns 230 and network demand 235. Further details regarding Block 520 are provided below in the description relating to FIG. 6.

Processor 420 may also predict a performance impact on the network based on the recommendations for potential new cell site locations (Block 530). In an embodiment, predicting the performance impact may include modeling the offload potential of the potential new cell sites for the sectors within the geographical region of the network.

Processor 420 may select network upgrades based on the recommendations for potential new cell site locations, the network demand, and the predicted performance impact (Block 540). In an embodiment, selecting network upgrades may include determining an optimal cell site upgrade based on forecasted capacity triggers, cellular market constraints, operational feasibility constraints, time implementation constraints, site configuration, and/or available spectrum. Network upgrades may be associated with the implementation of optimal cell site upgrades that may include at least one of adding additional transmission paths, providing additional carriers, improving a cell antenna, providing additional spectrum for one or more existing cell sites 110. Network upgrades may further include providing one or more potential new cell sites 115 within geographical region 105, where the locations of potential new cell sites may be specified by SPT 210.

FIG. 6 is a flowchart illustrating an exemplary process 600 associated with SPT 210 and includes generating recommendations (e.g., locations, cell site types, and/or operating parameters) for potential new cell sites 115. Process 600 may be performed by network device 400, which may be external to core 120 (e.g., implemented in URS 124), and execute instructions on processor 420 for performing solution placement in geographical region 105, operating parameter selection, and/or type recommendations of potential new cell sites 115 for WWAN 100. Alternatively, in another embodiment, network device 400 may be embodied as a network element residing in core 120 and perform additional standard network core functions in addition to performing process 600. Processor 420 may identify recommendations for locations of potential new cell sites 115 by identifying bins 107 associated with each sector in the geographical region (Block 610). Processor 420 may then determine for each sector, inter-site radii between existing cell sites 110 and potential new cell sites 115 (Block 620). Thus, in Blocks 610 and 620, bins 107 may be analyzed and assigned acceptable radii relative to existing cell sites 110. In an embodiment, SPT 210 may average the distance between three existing cell sites 110 and a potential new cell site 115-*x* for each type of cell site (e.g., small cell, macro cell, etc.).

Figure 7A:
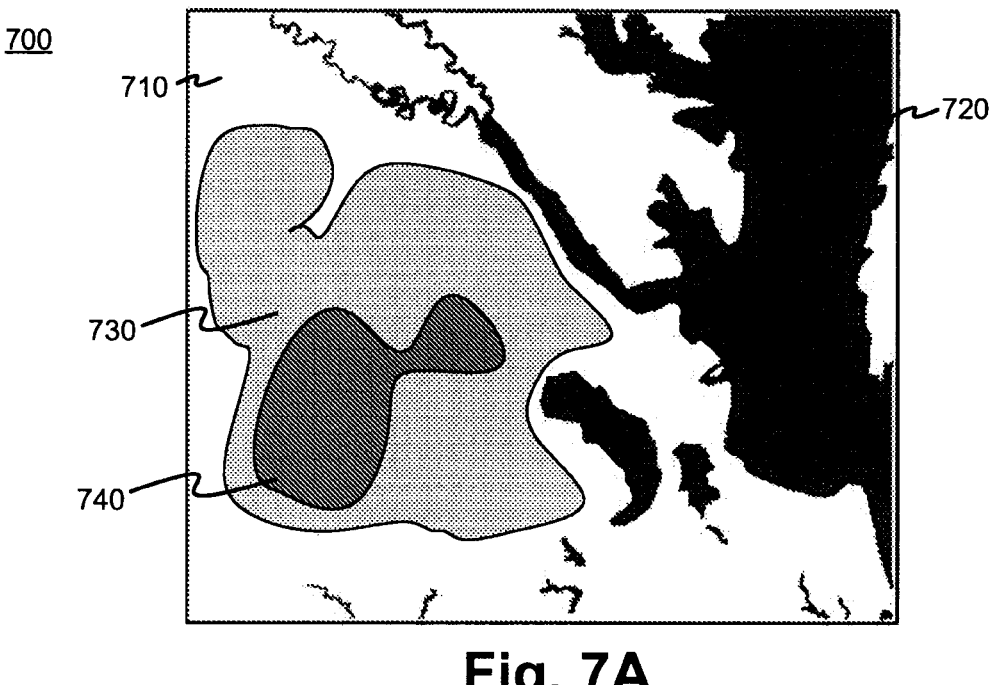
FIG. 7A-7C are diagrams of a region illustrating various stages of a process for recommending upgrades for a WWAN.
Figure 7B:
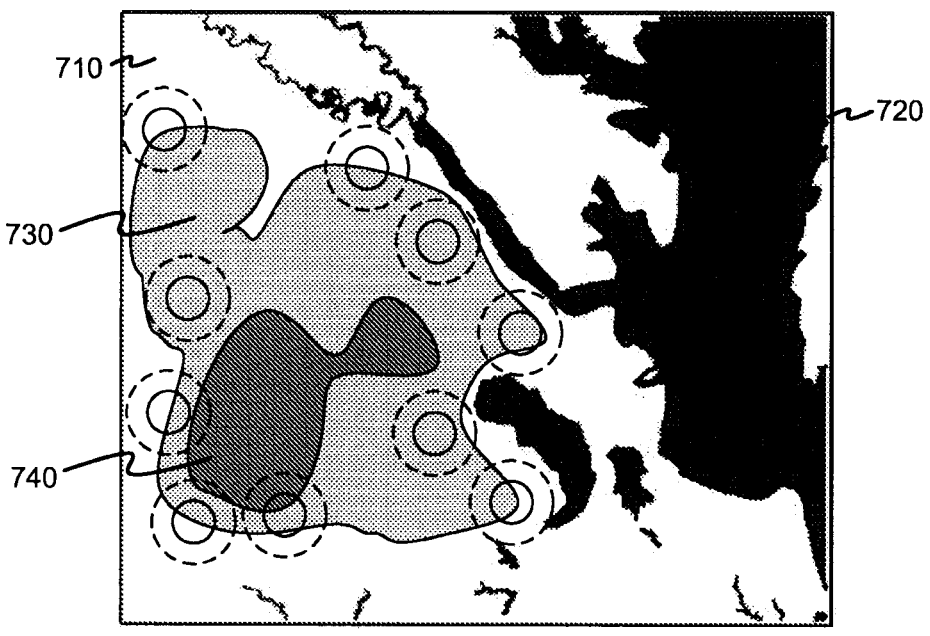
Figure 7C:
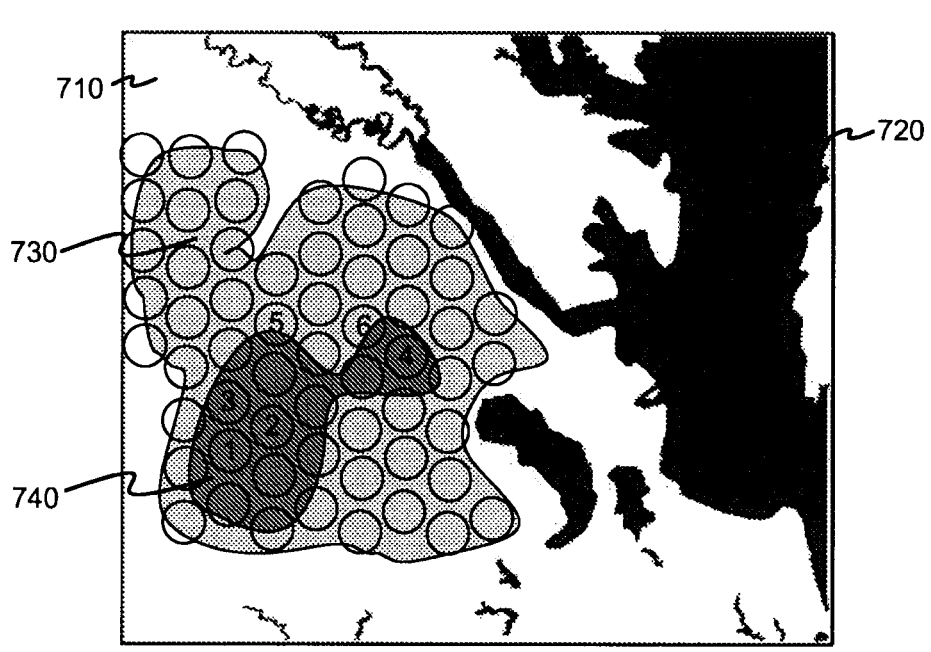

Further referring to FIG. 6, processor 420 may identify bins having inter-site radii which are associated with the existing cell sites 110 that serve the largest amount of traffic to determine locations for potential new cell sites 115 (Block 630). As an illustrative example, a region 700 is shown in FIGS. 7A-7C, where region 700 includes land areas 710 and water areas 720. As shown in FIG. 7A, areas 730 and 740 correspond to radii having different traffic densities. For example, the lighter area 730 is associated with radii having lower data traffic flows, and the darker area 740 is associated with radii having higher data traffic flows. With respect to FIG. 7A, process 600 in Block 630 may identify bins in area 740 for potential new cell sites 115 as radii within area 740 that are associated with higher data traffic flows. In an embodiment, data traffic flow may be based on geospatial key performance indicators (KPIs) which may include timeslot data, radio resource control (RRC) data, the type of cell site, etc.)

Further referring to FIG. 6, processor 420 may exclude potential new cell sites 115 which are within a minimum proximity to existing cell sites 110 (Block 640). Accordingly, processor 420 may prevent placing potential new cell sites 115 too close to existing cell sites 110, regardless of the amount of the traffic flow in existing cell sites 110. Potential new cell sites 115 may be "too close" to existing cell sites 110 depending upon the RF frequencies, structural characteristics (e.g., monopole, utility pole, etc.), and deployment type (e.g., macro-cell, micro-cell, etc.) of a potential new cell site 115 deployment. For example, lower frequencies may propagate further, therefore having a higher likelihood of causing interference if spaced "too close." As shown in FIG. 7B, concentric circles are drawn around existing cell sites 110 in both lower traffic flow area 730 and higher traffic flow area 740. The solid (smaller) circles delineate areas too close to an existing cell site 110 for the placement of a new small cell and/or micro cell site. The dashed circles shown in FIG. 7B delineate areas too close to an existing cell site 110 for a macro cell site.

Processor 420 may select a new cell site 115-X associated with bins having the largest amounts of traffic (Block 650). Additional potential new cell site placements 115, each subsequent one being associated with lesser data traffic flow, may be determined iteratively by looping through Blocks 630 through 650 as shown in FIG. 6. Once all of the potential new cell site 115 placements are determined, SPT 210 data may be forwarded to OPT 215.

As shown in FIG. 7C, the candidate map 700 illustrates potential new cell site 115 placements shown as circles in regions 730 and 740. Moreover, the potential new cell site placements may be ranked in order of highest data traffic and labeled accordingly. For example, as shown in FIG. 7C, circles labeled 1, 2, 3, and 4, which reside completely in area 740, are the top four potential new cell site 115 locations in terms of highest data traffic flow. Circles labeled 5 and 6, which straddle areas 730 and 740, and are ranked lower in terms of data traffic (e.g., 5 and 6) than the circles residing in area 740. Additionally, process 600 may predict or generate network settings of the potential new cell sites. 115, such as, for example, the cell type (e.g., macro cell, micro cell, femto cell, etc.) and the expected transmission radius associated with the cell type.

Figure 8:
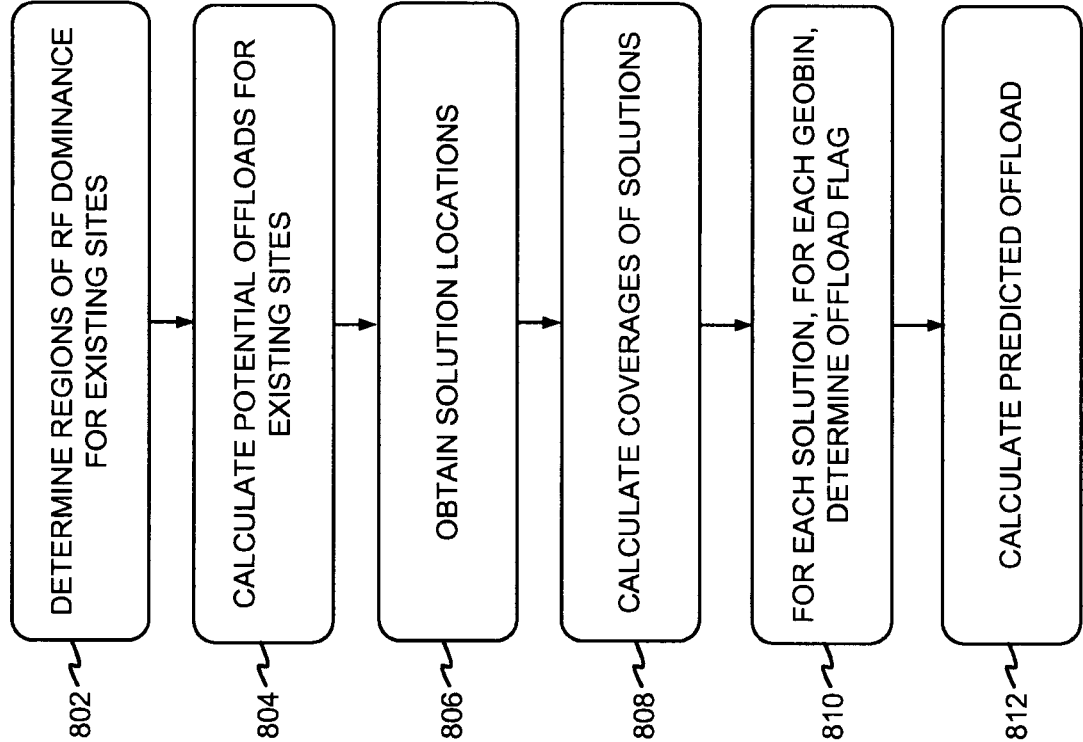
FIG. 8 is a flowchart of an exemplary process for predicting offloads from existing cell sites to new cell sites.
Figure 9B:
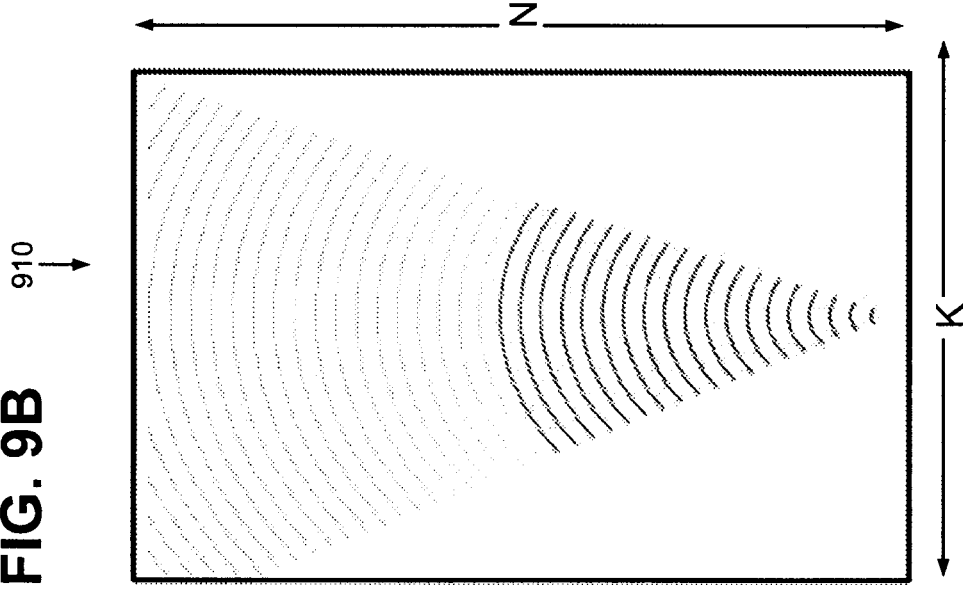
FIG. 9B illustrates an exemplary distance histogram, for an existing cell site, according to an implementation.
Figure 9A:
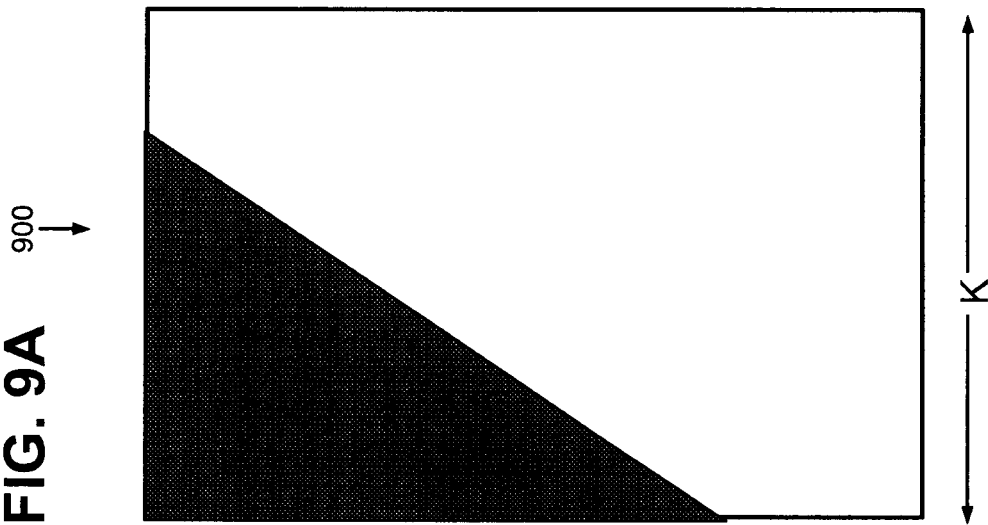
FIG. 9A shows an exemplary best server plot for an existing cell site, according to an implementation.

FIG. 8 is a flowchart of an exemplary process 800 for predicting offloads from existing cell sites 110 to new cell sites 115 (or solutions 115). Although process 800 is described below as being performed by OPT 215, depending on the implementation, process 800 may be performed by other platforms, programs, and/or devices. As shown, process 800 may include OPT 215 determining regions of RF dominance for existing cell sites 110 (Block 802), based on, for example, information provided by NUM inputs 220 on existing cell sites 110 (e.g., location information, traffic on particular days, hour, coverage areas, etc.). For an existing cell site 110, for a predefined area, OPT 215 may generate a best server plot that indicates one or more regions for which the existing cell site 110 has RF dominance (e.g., the cell site 110 has the greatest transmitted power as compared to other sites) and coverage. Accordingly, a best server plot may show both regions in which signals from existing cell site 110 are present and regions in which the signals are not present (e.g., due to other cell sites, due to non-transient occlusion, due to the presence of buildings, trees, etc.). Each best server plot may include regions that overlap with other regions covered by other cell sites. Some of the reasons for allowing for predicted overlap are to account for possible inaccuracies of the RF prediction model and to account for reality-based Radio Access Network (RAN) parameters that are set to avoid "ping-ponging" of User Equipment devices (UEs) between sites (e.g., a handoff from a first cell site to a second cell site, followed by a handoff from the second cell site to the first cell site, and so on). The size of an overlap in a best server plot may depend on the implementation. For example, in one implementation, an overlap may cover areas in which the Reference Signal Received Power (RSRP) of one existing cell site 110 is greater than those of other cell sites by at least a given margin (e.g., 9 dB). FIG. 9A shows an exemplary best server plot 900 for existing cell site 110, according to an implementation. A dark triangle on the upper left side of best server plot 900 indicates a region in which existing cell site 110 is not RF dominant. Other non-colored parts of best server plot 900 are covered by a cell site 110 that is RF dominant. The vertical and horizontal axis of plot 900 represents indices that designate a particular bin (e.g., a bin in a Military Grid Reference System (MGRS), Google Spherical Geometry 2, Uber Hexagonal Hierarchical Spatial Index system, or another type of geobin (also referred to as bin) system). In other implementations, OPT 215 may determine regions of the RF dominance and store the resulting information in another format, rather than as a best server plot.

Process 800 may further include OPT 215 calculating potential offloads for existing cell sites (Block 804). For an existing cell site 110, the potential offload may be calculated based on the best server plot (determined at Block 802), a distance histogram, and a heatmap. A distance histogram of an existing cell site 110 shows network traffic, within a specified period of time (e.g., a week), at various distances from the existing cell site 110, as a percentage of the overall traffic for the existing cell site 110 over the same time period. Each distance histogram, thus, may be a function of distance. FIG. 9B illustrates an exemplary distance histogram 910 for an existing cell site. Each arc in distance histogram 910 corresponds to the percentage of the traffic at particular a distance from existing cell site 110. The arcs are spaced apart by a scaled distance (e.g., a scaled real life distance, such as 0.1 mile or another predetermined distance). The k in the horizontal axis represents a horizontal index of a geobin (in a set of K geobins into which the area is divided in accordance with a particular spatial system) and n represents the azimuthal distance (from 0 to N in increments of the predetermined distance) from existing cell site 110.

A heatmap shows different levels of traffic to/from a location (represented by different colors) from/to existing cell site 110. FIG. 9C is an exemplary heatmap 920. Heatmap 920 illustrates different levels of traffic in a coverage area of cell site 110, where each color or gradient of color (shown in grayscale in FIG. 9C) corresponds to a different traffic level. A heatmap, such as heatmap 920, may be subdivided into geobins and may be a function (per geobin k) of any spatial data pertinent to offload calculations. For example, in some implementations, heatmap 920 may include Census population density, triangulated aggregates of traffic, etc.

Referring back to block 804, for each existing cell site 110, OPT 215 may calculate an offload based on the best server plot, the distance histogram, and the heatmap over the area covered by the best server plot. More specifically, OPT 215 may evaluate the expression:

$$L_E(k) = \sum_0^{ND} D(i) \frac{H(k, n)}{\sum_0^K H(k, n)}. \qquad (1)$$

In expression (1), $L_E(k)$ may denote an offload in terms of a percentage, at $k^{th}$ geobin. in the area, specified in accordance with a particular spatial system. $D(i)$ may denote the percentage of traffic at a distance corresponding to the distance index i, obtained from the distance histogram, $H(k, n)$ may denote the amount of traffic at $k^{th}$ geobin at distance n designated in the heatmap. The summation of $H(k, n)$ in the denominator of expression (1) is performed over k geobins, and thus denotes the total traffic of all the geobins at distance n. The fraction resulting from dividing $H(k, n)$ by the sum thus represents the ratio of the traffic for $k^{th}$ geobin at distance n to the total traffic at distance n for all the geobins in the area according to the heatmap.

Figure 9D:
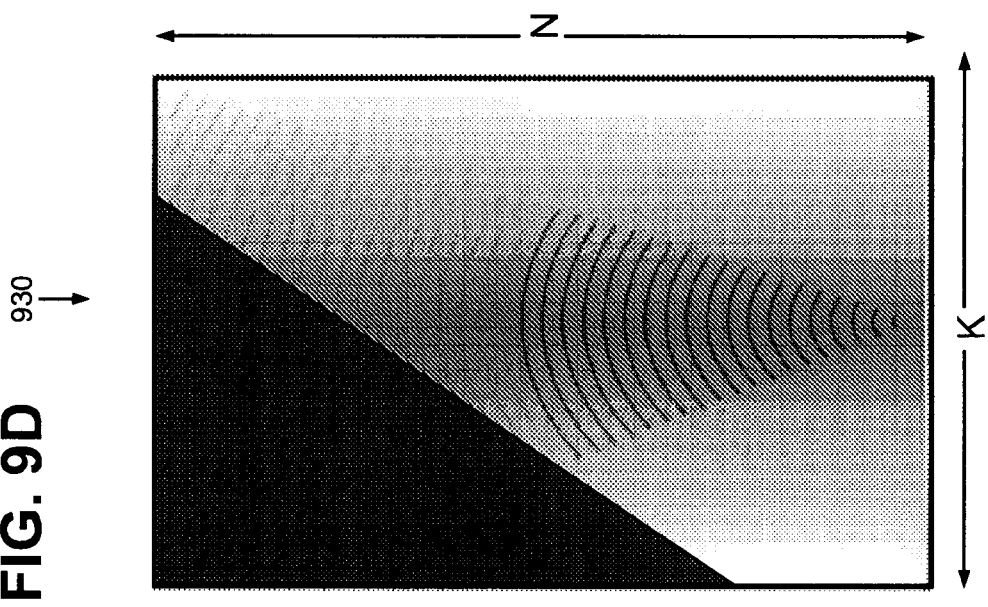
FIG. 9D is an exemplary overlay of a best server plot, a distance histogram, and a heatmap for a cell site, according to an implementation.
Figure 9C:
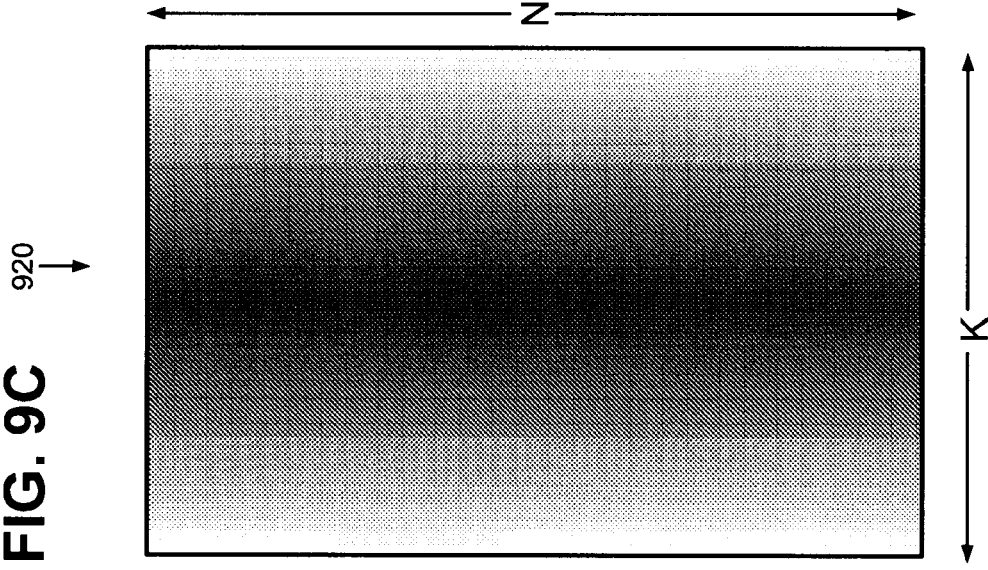
FIG. 9C is an exemplary heatmap according to an implementation.

FIG. 9D is an exemplary overlay of best server plot 900, distance histogram 910, and heatmap 920 for existing cell site 110. FIG. 9D illustrates the relationship between best server plot 900, distance histogram 910 where each arc represents traffic at a particular distance over a given time interval, and heatmap 920 whose grayscale gradient indicates the amount of traffic.

Referring back to FIG. 8, process 800 may include OPT 215 obtaining the location information for new cell sites 115 from SPT 210 (Block 806). The new cells sites 115 may include sites whose initial location information has been input to SPT 210 for optimization or location information that has been manually input. In addition, OPT 215 may receive settings for new cell sites 115. After obtaining the locations of new cell sites 115 (or solution locations), OPT 215 may calculate RF coverages for new cell sites 115 (Block 808), with respect to geobins in a spatial system. The calculated RF coverage of new cell sites 115 may be "raw" and may not be constrained by best server plots—to include regions for which potential offloads have been computed at Block 804. OPT 215 may compute the RF coverages based on the maximum RSRP for all transmitters of new cell sites 115.

Process 800 may further include OPT 215 determining, for each new cell site 115, for each kth geobin, an offload flag (Block 810). An offload flag may indicate, for a given geobin in the spatial system, whether an offload is to occur from an existing cell site 110 to a new site 115. The criteria for setting the flags may be implementations. In one implementation, the offload flags may be determined in accordance with the following conditions:

$$F_{SE}(k)=1 \text{ when } S_{RSRP}(k) >= E_{RSRP}(k) + \text{LB Threshold} \qquad (2),$$

and $$F_{SE}(k)=0 \text{ when } S_{RSRP}(k) < E_{RSRP}(k) + \text{LB Threshold.} \qquad (3).$$

In expressions (2) and (3), $S_{RSRP}(k)$, $E_{RSRP}(k)$, and LB Threshold denote the RSRP of new site 115, the RSRP of existing cell site 210, and a load balancing (LB) threshold for the $k^{th}$ geobin in the spatial system. LB threshold may be set based on operating bands on new cell site 115 and existing cell site 110 In accordance with live or expected RAN handoff/offload configurations. FIG. 10A shows table 1000 of example LB thresholds for different new cell site operating bands and existing cell site operating bands. More specifically, table 1000 shows LB thresholds for various combinations of new cell site-bands (S-BAND) versus existing cell site-band (E-BAND). Table 1000 illustrates, for example, possible conditions where new cell site 110 can offload the $k^{th}$ geobin from existing cell site 115: +6 dB for S-BAND and E-BAND of LOW and LOW; −6 dB for S-BAND and E-BAND values of LOW and HIGH; +6 dB for S-BAND and E-BAND values of HIGH and LOW; and 0 dB for S-BAND and E-BAND values of HIGH and HIGH. LOW and HIGH indicate a lower and higher FREQUENCY portion of a spectrum, respectively. In other implementations, conditions other than those indicated by expressions (2) and (3) may be used to set the offload flags.

Figure 10B:
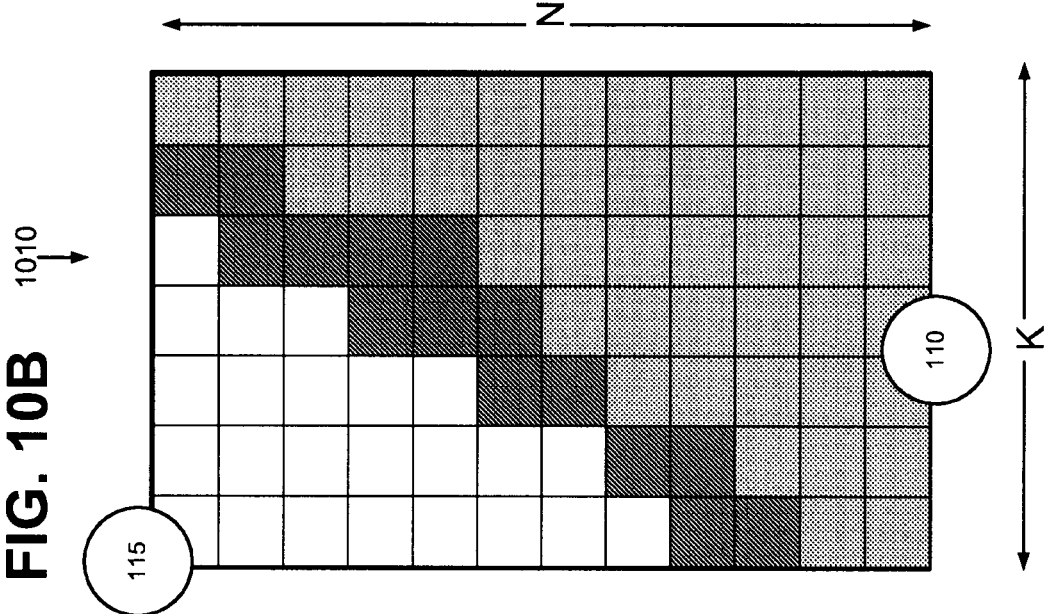
FIG. 10B illustrates exemplary offload flags for grid system bins in a given area.

FIG. 10B illustrates, for existing cell site 110 and new site 115, offload flags for geobins in a given area 1010. In FIG. 10B, the white blocks represent geobins for which condition (2) holds but no offload occurs from existing cell site 110; the lightly shaded blocks represent geobins for which condition (3) holds and thus no offload occurs; and the darkly shaded blocks represent geobins for which condition (2) holds and offloading from the existing cell site 110 to the new site 115 occurs.

Referring back to FIG. 8, process 800 may include OPT 215 calculating a predicted offload to new cell site 115 from an existing cell site 110 (Block 812). OPT 215 may determine the predicted offload by computing:

$$S_E = \sum_0^K L_E(k)F_{SE}(k), \qquad (4)$$

In expression (4), $S_E$ denotes the predicted offload to a solution (new cell site 115) from existing cell site E; and $L_E(k)$ denotes potential offloads, at geobins, computed at Block 804 in accordance with expression (1); and $F_{SE}(k)$ denotes the offload flags determined based on expressions (2) and (3). In FIG. 10B, evaluating expression (4) amounts to summing the offloads for the dark shaded areas over k.

Figure 11:
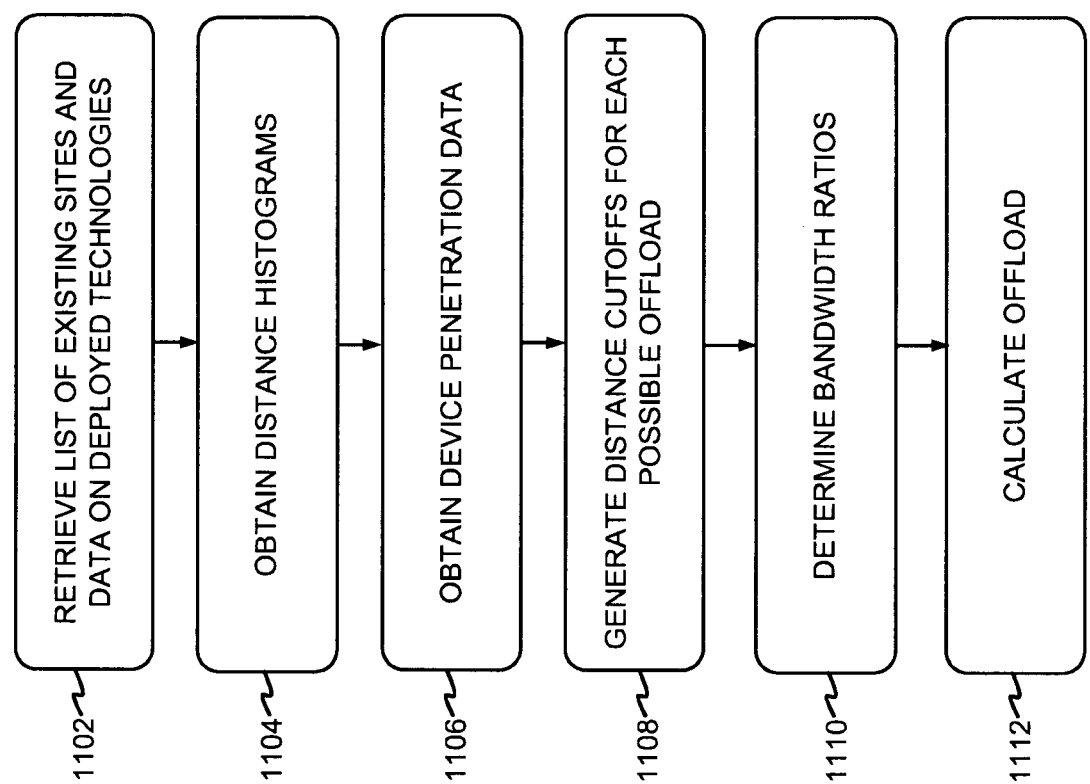
FIG. 11 is a flowchart of an exemplary process predicting offloads at existing cell sites due to adding an additional capacity for traffic, a change in technology, or adding a new technology.

FIG. 11 is a flowchart of an exemplary process 1100 for predicting offloads at existing cell sites due to a change in technology, such as an upgrade or change to support different frequency bands. Although process 1100 is described below as being performed by OPT 215, in other implementations, process 1100 may be performed by other platforms, programs, and/or devices. As shown, process 1100 may include OPT 215 retrieving a list of existing cell sites 110 and deployed technologies (Block 1102), the locations of existing cell sites 110, and their distance histograms (Block 1104). For example, a distance histogram may indicate traffic every X distance (e.g., 0.1 mile) per week of traffic (or traffic over another time period).

Process 1100 may further include obtaining and/or retrieving device penetration data (Block 1106). As used herein, the term "device penetration" (denoted P) may refer to, within a specified region, a measure (e.g., a percentage, a fraction, or another type of value) of devices, with cellular capabilities in one or more selected bands and/or technologies, within a set of devices with communication capabilities in other bands. For example, a device penetration P for sub 6 GHz-capable mobile devices (e.g., smart phones) may be estimated to be X % of cellular devices in 2022, Y % of cellular devices in 2023, Z % of devices in 2025; where $X < Y < Z$. For most bands or technologies that have been in use for a long time, the device penetration P may be assumed to be 100%. In other implementations, the device penetration P may be obtained for particular areas, with a greater granularity than at the national level. Such device penetration data may provide more accurate offload prediction than device penetration data with less granularity.

Process 1100 may further include OPT 215 determining distance cutoffs for a possible offload at each existing cell site 110 (Block 1108). In one implementation, distance cutoffs may be determined based on a precomputed average cutoff distance for different bands, where the distances are measured in a particular unit (e.g., km, miles, yards, feet, etc.). For example, for a sub 1 GHz range, the distance cutoff may be set to 9 miles; for a sub 3 GHz range, the distance cutoff may be set to 4.5 miles; and for a sub 6 GHz range, the distance cutoff may be set to 2.0 miles. In other implementations, more accurate distance cutoffs may be determined based on empirical data.

Process 1100 may further include computing bandwidth ratios for existing cell sites 110 (Block 1110). A bandwidth ratio may indicate the load balancing, at an existing cell site, from the current bands to new bands due to the change or addition to technology (e.g., a technology for communicating over the new bands). Without bandwidth ratios (and thus no load balancing between the bands), the lower band may be typically seen as more RF dominant. A bandwidth ratio may be determined by:

$$B_R = S_B / (E_B + S_B) \qquad (5).$$

In expression (5), $B_R$, $S_B$, and $E_B$ denote the bandwidth ratio, the bandwidth of at existing cell site 110 due to the current technology, and the additional bandwidth at existing cell site 110 due to the new technology.

Process 1100 may further include, for each of existing cell sites 110, calculating an offload (Block 1112). The calculations may be performed in accordance with the following expression:

$$M_E = B_R P \sum_0^C D(i). \qquad (6)$$

In expression (6), $D(i)$ denotes the percent traffic in the distance histogram at the distance designated by the distance index i. $D(i)$ is summed over the geobins located within the cutoff distance, whose index is denoted in expression by C. P is the device penetration discussed above with reference to Block 1106, and $B_R$ is the bandwidth ratio discussed above with reference to Block 1110.

The foregoing description of implementations provides illustration and description but is not intended to be exhaustive or to limit the invention to the precise form disclosed. Modifications and variations are possible in light of the above teachings or may be acquired from practice of the invention. For example, while series of messages and/or blocks have been described with regard to FIGS. 5-6, 8, and 11, the order of the messages and/or blocks may be modified in other embodiments. Further, non-dependent messaging and/or processing blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A device comprising:
a processor configured to:
 receive information about an existing cell site;
 generate a distance histogram for the existing cell site based on the received information;
 at least one of:
  calculate, using the generated distance histogram, a first value that indicates an expected amount of traffic to be offloaded from the existing cell site to a new cell site, or
  calculate, using the generated distance histogram, a second value that indicates an expected amount of traffic to be offloaded from operating bands of the existing cell site as a result of a change at the existing cell site; and
 provide at least one of the calculated first value or the second value to another device,
 wherein when calculating the first value, the processor is configured to:
  generate a best server plot for the existing cell site;
  obtain a heatmap for the existing cell site based on the received information; and
  evaluate the first value based on the generated best server plot, the heatmap, and the distance histogram.

2. The device of claim 1, wherein the best server plot indicates regions in which the existing cell site has a Radio Frequency (RF) dominance over other cell sites.

3. The device of claim 1, wherein when the processor evaluates the first value, the processor is configured to:
 determine a traffic increment, to be offloaded from the existing cell site to the new cell site, for each Military Grid Reference system (MGRS) bin; and
 aggregate the traffic increments over the MGRS bins to obtain the first value.

4. The device of claim 3, wherein when the processor aggregates the traffic increments, the processor is configured to:
 accumulate the traffic increments for a subset of the MGRS bins, wherein the subset excludes MGRS bins in which the new cell site does not have a Radio Frequency (RF) dominance.

5. The device of claim 3, wherein when the processor aggregates the traffic increments, the processor is configured to:
 determine whether a Reference Signal Received Power (RSRP) of the new cell site is greater than a sum of a RSRP of the existing cell site and a load balancing threshold for the MGRS bins.

6. The device of claim 5, wherein the load balancing threshold is set based on an operating band of the new cell site and an operating band of the existing cell site.

7. The device of claim 1, wherein when the processor calculates the second value, the processor is configured to:
 obtain a device penetration associated with device technology;
 obtain a distance cutoff for the existing cell site; and
 compute the second value based on the device penetration and the distance cutoff.

8. The device of claim 7, wherein when the processor computes the second value, the processor is configured to:

multiply a band ratio determined based on currently used bands at the existing cell site and potential new bands at the existing cell site.

9. The device of claim 7, wherein the device penetration indicates a percentage of mobile devices with a technology that uses additional bands at the existing cell site.

10. A method comprising:
receiving information about an existing cell site;
generating a distance histogram for the existing cell site based on the received information;
performing at least one of:
 calculating, using the generated distance histogram, a first value that indicates an expected amount of traffic to be offloaded from the existing cell site to a new cell site, or
 calculating, using the generated distance histogram, a second value that indicates an expected amount of traffic to be offloaded from operating bands of the existing cell site as a result of a change at the existing cell site; and
providing at least one of the calculated first value or the second value to a device,
wherein calculating the first value includes:
 generating a best server plot for the existing cell site;
 obtaining a heatmap for the existing cell site based on the received information; and
 evaluating the first value based on the generated best server plot, the heatmap, and the distance histogram.

11. The method of claim 10, wherein the best server plot indicates regions in which the existing cell site has a Radio Frequency (RF) dominance over other cell sites.

12. The method of claim 10, wherein evaluating the first value includes:
 determining a traffic increment, to be offloaded from the existing cell site to the new cell site, for each Military Grid Reference system (MGRS) bin; and
 aggregating the traffic increments over the MGRS bins to obtain the first value.

13. The method of claim 12, wherein aggregating the traffic increments includes:
 accumulating the traffic increments for a subset of the MGRS bins, wherein the subset excludes MGRS bins in which the new cell site does not have a Radio Frequency (RF) dominance.

14. The method of claim 12, wherein aggregating the traffic increments includes:
 determining whether a Reference Signal Received Power (RSRP) of the new cell site is greater than a sum of a RSRP of the existing cell site and a load balancing threshold for the MGRS bins.

15. The method of claim 14, wherein the load balancing threshold is set based on an operating band of the new cell site and an operating band of the existing cell site.

16. The method of claim 10, wherein calculating the second value includes:
 obtaining a device penetration associated with a device technology;
 obtaining a distance cutoff for the existing cell site; and
 computing the second value based on the device penetration and the distance cutoff.

17. The method of claim 16, wherein computing the second value includes:
 multiplying a band ratio determined based on currently used bands at the existing cell site and potential new bands at the existing cell site.

18. A non-transitory computer-readable medium comprising processor executable instructions, which when executed by a processor causes the processor to:

receive information about an existing cell site;

generate a distance histogram for the existing cell site based on the received information;

at least one of:

calculate, using the generated distance histogram, a first value that indicates an expected amount of traffic to be offloaded from the existing cell site to a new cell site, or calculate, using the generated distance histogram, a second value that indicates an expected amount of traffic to be offloaded from operating bands of the existing cell site as a result of a change at the existing cell site; and provide at least one of the calculated first value or the second value to a device, wherein when calculating the first value, the processor is configured to:

generate a best server plot for the existing cell site;

obtain a heatmap for the existing cell site based on the received information; and evaluate the first value based on the generated best server plot, the heatmap, and the distance histogram.

19. The non-transitory computer-readable medium of claim 18, wherein the best server plot indicates regions in which the existing cell site has a Radio Frequency (RF) dominance over other cell sites.

20. The non-transitory computer-readable medium of claim 18, wherein when evaluating the first value, the processor is configured to:

determine a traffic increment, to be offloaded from the existing cell site to the new cell site, for each Military Grid Reference system (MGRS) bin; and aggregate the traffic increments over the MGRS bins to obtain the first value.

* * * * *